United States Patent [19]

Kontz

[11] 4,224,263
[45] Sep. 23, 1980

[54] METHOD FOR BLOW MOLDING

[75] Inventor: Robert F. Kontz, Toledo, Ohio

[73] Assignee: Owens-Illinois, Inc., Toledo, Ohio

[21] Appl. No.: 886,488

[22] Filed: Mar. 14, 1978

[51] Int. Cl.² .............................................. B29C 17/07
[52] U.S. Cl. ..................................... 264/25; 264/521; 264/535; 425/526
[58] Field of Search ....................... 264/25, 89, 94, 96, 264/97–99, 297, 521, 535; 425/526; 432/11; 219/341, 343, 347–349, 342, 354, 388, 377, 405, 411, 531

[56] References Cited

U.S. PATENT DOCUMENTS

| | | | |
|---|---|---|---|
| 2,792,593 | 5/1957 | Hardgrove, Jr. | 425/526 X |
| 3,003,409 | 10/1961 | Mills | 219/411 X |
| 3,283,046 | 11/1966 | Dewitt et al. | 425/526 X |
| 3,761,550 | 9/1973 | Seefluth | 264/521 X |
| 3,787,170 | 1/1974 | Gilbert | 264/521 X |
| 3,972,127 | 8/1976 | Hoshi et al. | 219/343 X |
| 3,975,618 | 8/1976 | Goos et al. | 219/388 |
| 4,079,104 | 3/1978 | Dickson et al. | 264/25 |

FOREIGN PATENT DOCUMENTS 2352926  4/1975  Fed. Rep. of Germany ............ 264/94

Primary Examiner—Jan H. Silbaugh
Attorney, Agent, or Firm—Charles S. Lynch; Myron E. Click; David H. Wilson

[57] ABSTRACT

Method and apparatus for blow molding plastic articles from preformed parisons by reheating the parisons and then stretching and blowing them. The parisons are conveyed in series to a plurality of fixed heating stations at which the parisons are fixedly positioned for heating, the parisons being rotated for uniform heating. The heating is enhanced by blowing air under pressure through a tunnel enclosing the successive heating stations. Finally, the parison is stretched and blown at a blow station in a blow mold of unique design.

3 Claims, 12 Drawing Figures

METHOD FOR BLOW MOLDING

BACKGROUND OF THE INVENTION

In the manufacture of plastic articles from thermoplastic materials, such as polyethylene terephthalate, polypropylene, acrylonitrils and the like, it has been found that articles of enhanced physical properties are formed by stretching and blowing a preform into the final container. While it is possible, with some materials, to injection mold or extrusion form a parison which is then stretched and blown while still termoplastic from residual heat, it is preferable, with other materials, to reheat a preformed to the exact temperature desired and then stretch and blow the reheated parison to its final configuration.

Various processes and apparatus have been developed to carry out such blow molding operations. In one such process, the parison is reheated in an oven through which the parison travels continuously or intermittently in a heated atmosphere. The parisons are removed from the oven, either singly or in groups, and is stretched and blown. Alternatively, a series of parisons is placed on a heating wheel and conveyed past an array of fixed heating elements surrounding the periphery of the wheel until the parison is heated to the desired temperature. The parisons are than transferred to a second blow molding wheel where they are blown in succession in a series of molds traveling with the wheel.

In either of these prior art processes and apparatus, the handling of the parisons to the oven or the heating wheel, the transfer of the parisons after heating to the blow molding apparatus, and the blow molding of the parisons requires a complex, expensive apparatus having multiple blow molds and requiring large amounts of radiant energy to heat the moving parisons. Further, it is difficult to selectively heat different portions of the parison to facilitate the blowing of difficult shapes.

BRIEF DESCRIPTION OF THE PRESENT INVENTION

The present invention provides a novel approach to the blow molding of plastic articles from preformed parisons of thermoplastic material. The parisons are conveyed, in series, to successive heating stations at which the parisons are positioned to be heated by fixed, individual radiant energy sources. For greater heating efficiency, the parisons travel through a heating enclosure or "tunnel" and air is blown through the tunnel past the heat sources and over the parisons. This way, the parisons are heated by both radiation and convection. The parisons are continuously rotated during their travel through the tunnel to promote uniformity of heating.

After heating, the parisons are positioned, in succession, at a single blow mold station where the parisons are stretched and blown to form a final, biaxially oriented article. The present invention provides a novel blow mold arrangement and a novel method and apparatus for stretching the parison and for introducing blow air into the parison. Of course, the parison is not rotated during the blow molding operation, and a novel arrangement for rotating the parison during heating, but not during blowing, is provided. Additionally, the parison can be differentially heated.

All in all, the present invention provides an extremely simple, inexpensive, efficient process and apparatus for the blow molding of preformed parisons.

AS SHOWN ON THE DRAWINGS

DETAILED DESCRIPTION OF THE PREFERRED EMBODIMENTS

Figure 1:
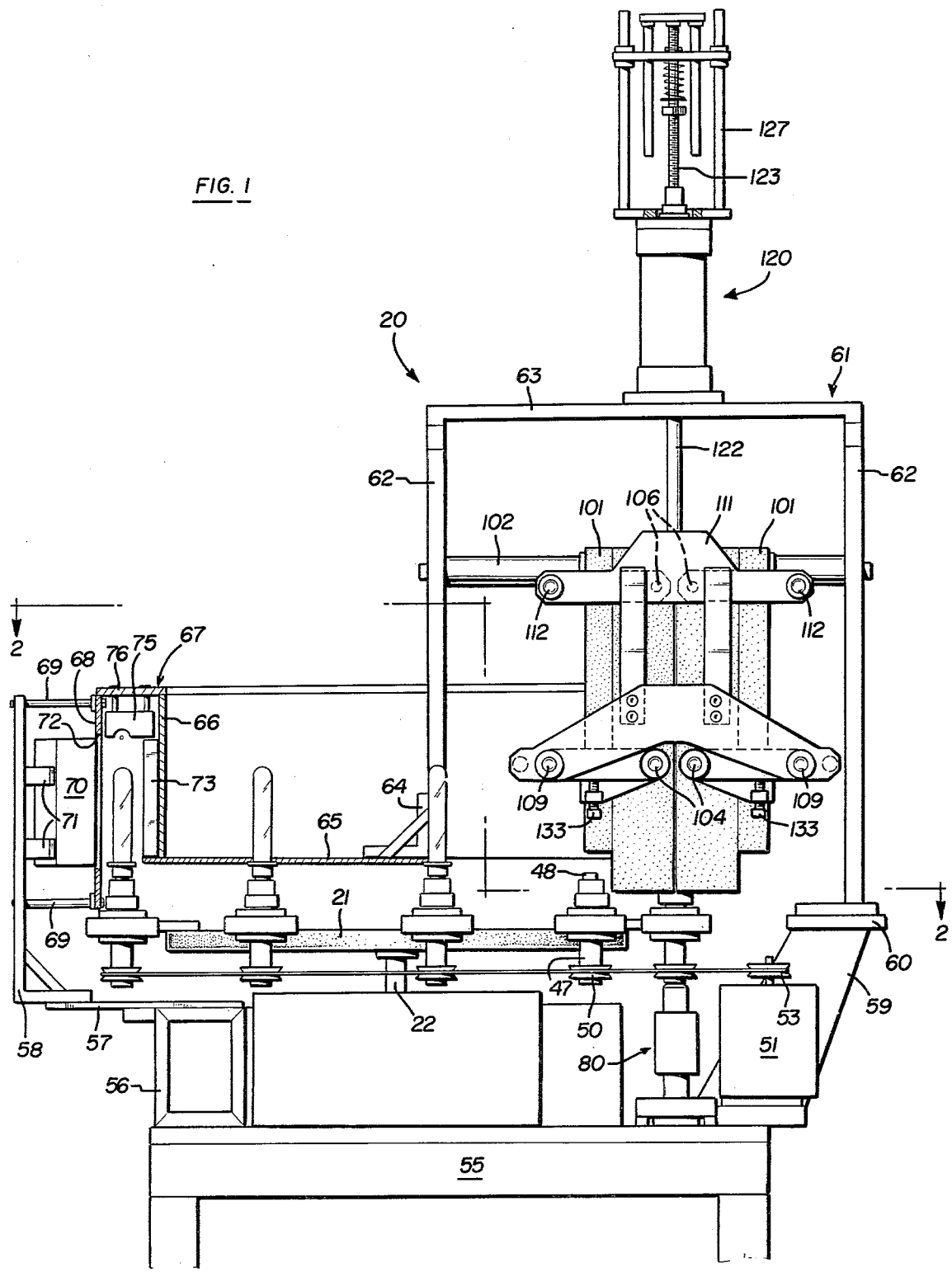
FIG. 1 is a side elevational view, with parts broken away and in section, of a blow molding apparatus of the present invention capable of carrying out the method of the present invention.
Figure 5:
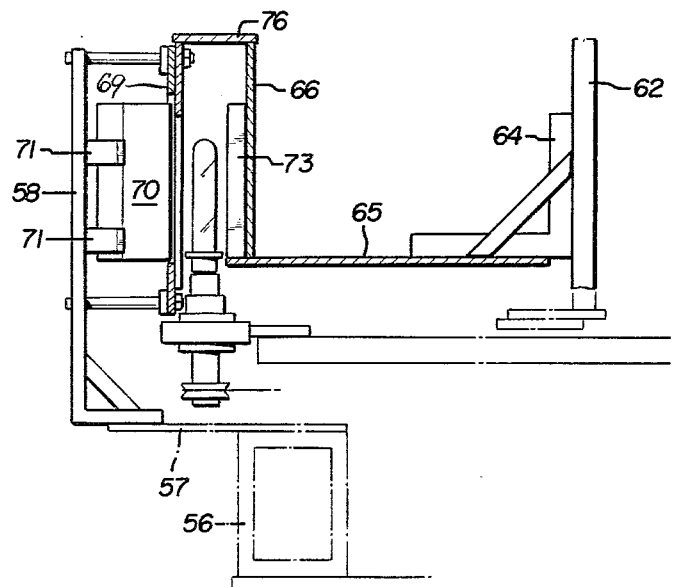
FIG. 5 is an enlarged fragmentary sectional view taken along the plane 5—5 of FIG. 2.

As shown on the drawings, reference numeral 20 refers generally to a blow molding machine of the present invention capable of carrying out the method of the present invention.

Figure 4:
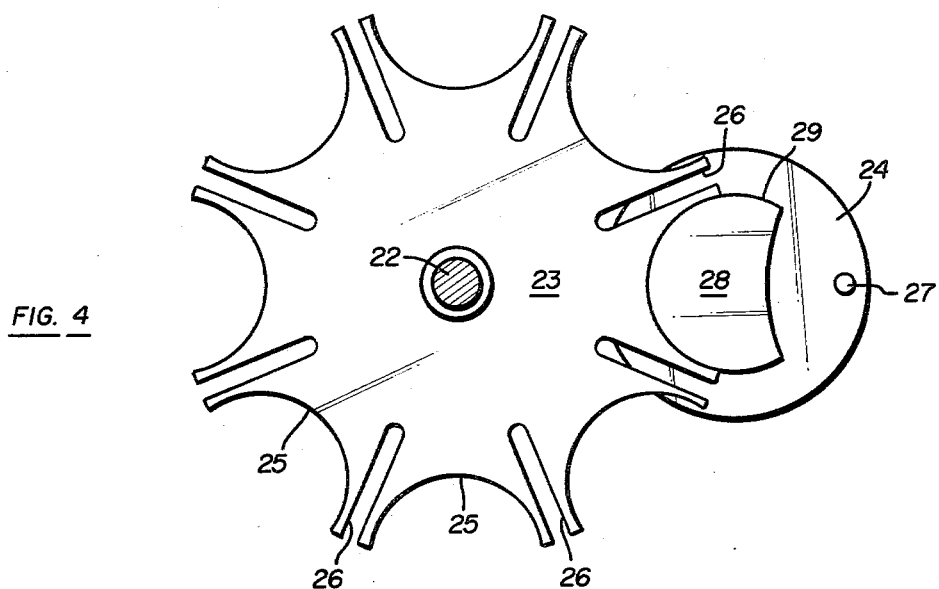
FIG. 4 is a sectional view taken along the plane 4—4 of FIG. 3.
Figure 3:
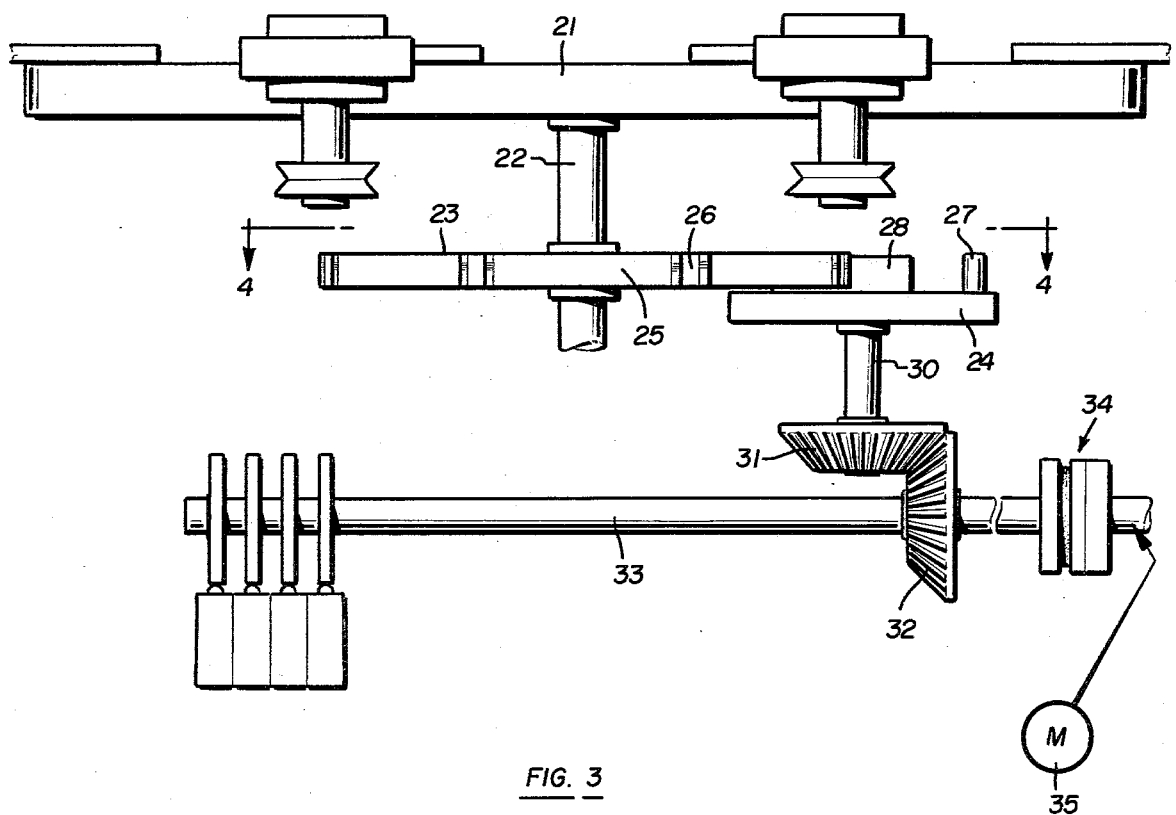
FIG. 3 is a diagramatic illustration of the driving mechanism for the apparatus of FIG. 1.

Specifically, the machine includes a base plate 21 rotatable in a horizontal plane on a vertical shaft 22. As best shown in FIGS. 3 and 4, the shaft 22 is fixed to a rotatable Geneva wheel 23 meshing with a Geneva drive gear 24. The wheel 23 is provided with arcuate recesses 25 spaced about its outer periphery with linear drive slots 26 interposed between the recesses 25. The gear 24 is provided with a drive pin 27 enterable into the slots 26 and a segmental, upstanding holding segment 28 having an arcuate peripery 29 enterable into the recesses 25. The gear 24 is mounted on the stub shaft 30 of a bevel gear 31 which meshes with a second bevel gear 32 mounted on a drive shaft 33. Drive shaft 33 is connected through a friction slip-clutch indicated generally at 34 to a drive motor 35.

In operation, the drive motor 35 continuously drives the gear 24, with the gear 24 rotating to advance the pin 27 counterclockwise for entry into the adjacent slot 26. Continued rotation of the gear 24 will rotate the wheel 23 in a clockwise direction to an arc of 45 degrees. Following the advance of the wheel 23, the arcuate surface 29 enters the wheel recess 25 and retains the wheel in position during continued rotation of the gear 24.

Thus, the wheel 23 rotates the base plate 21 through 1/8 of a rotation for each rotation of the gear 24. The dwell time and the time of incremental rotation is determined by the relative sizes and shapes of the wheel 23 and the gear 24. Of course, the size and configuration of either, or both, the wheel 23 and the gear 24 may be changed to provide differing numbers of stations, different dwell times, etc.

The slip-clutch 34 provides a definite safety factor, since any stoppage of rotation of the gears 31, 32, or of the Geneva drive 24, 23, or of the base plate 21 simply stops the movement of the base plate while the motor 35 continues to run.

Figure 2:
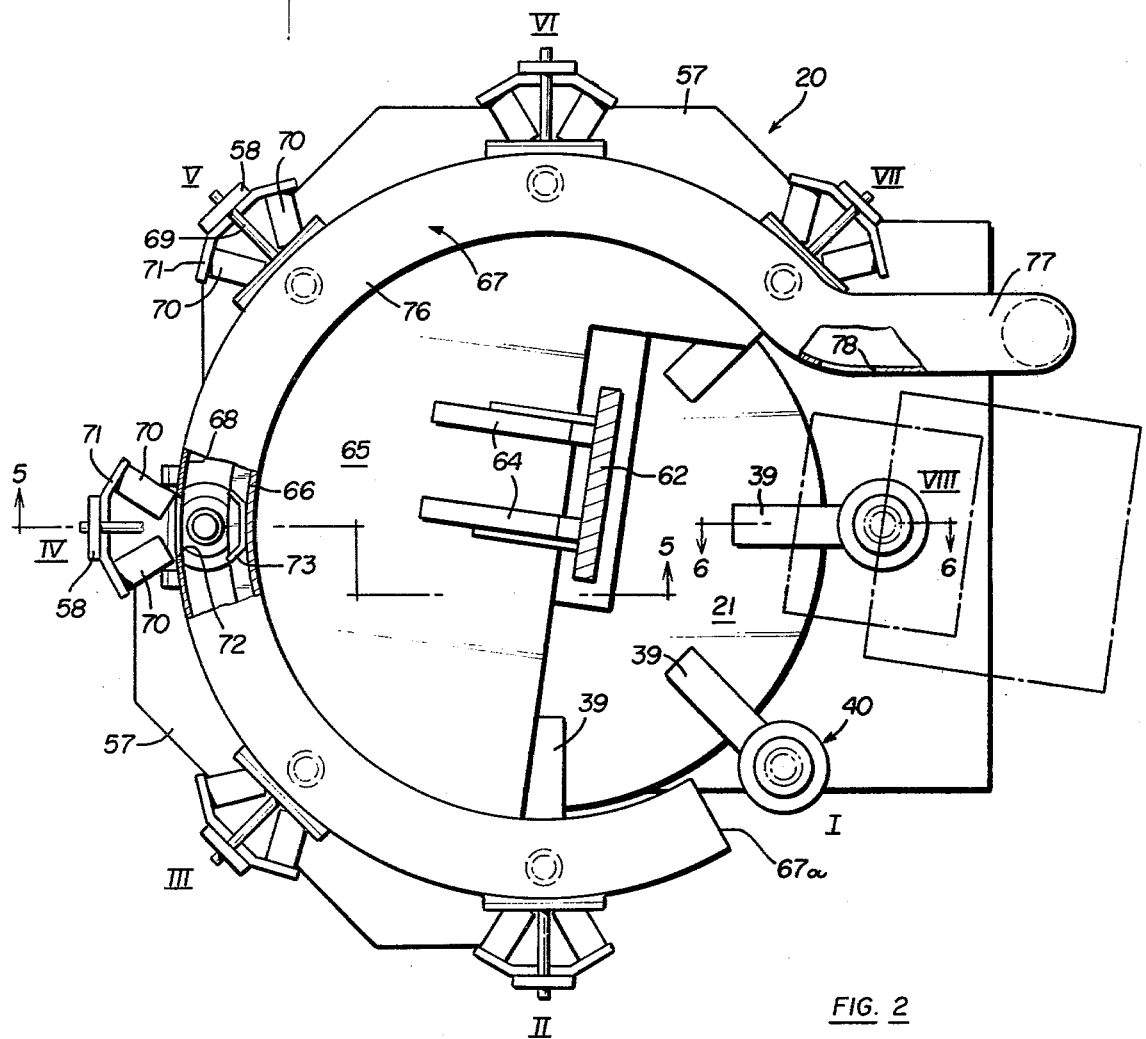
FIG. 2 is a view taken along the planes 2—2 of FIG. 1.

Turning now to FIGS. 1 and 2, it will be seen that the base plate 21 is provided with eight radially-extending support brackets 39 secured to the upper surface of the base plate 21 and projecting radially beyond the periphery of the base plate. These brackets 39 each carry, at their remote ends, a parison fixture 40.

Figure 6:
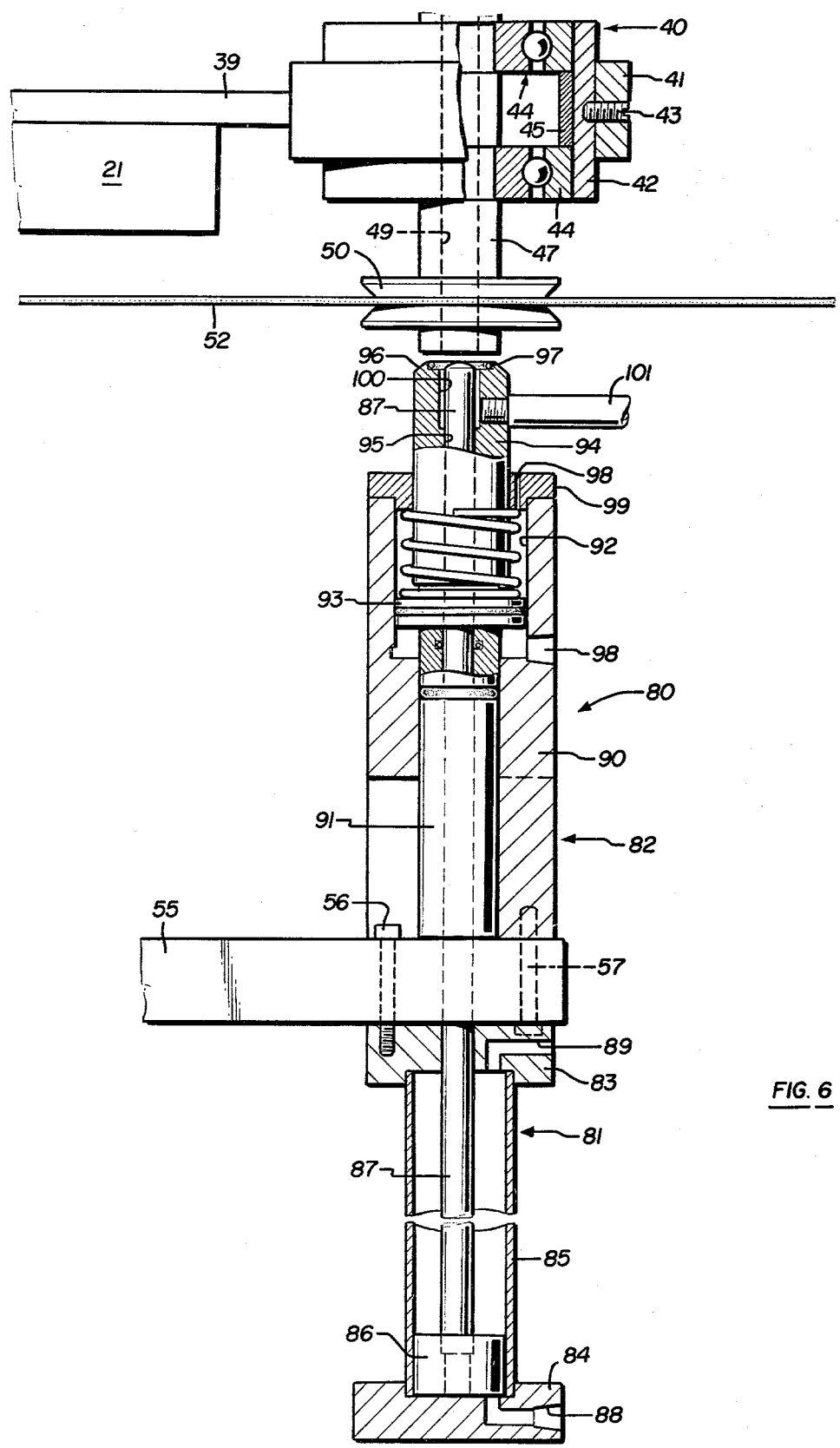
FIG. 6 is an enlarged fragmentary sectional view and taken along the plane 6—6 of FIG. 2.

As best seen in FIG. 6, each parison fixture 40 includes an outer annular collar 41 welded or otherwise secured to the outboard end of the bracket 39 and telescopically receiving therein a cylindrical bearing retainer 42 fixed to the collar 41 by suitable means, as by a set screw 43. The bearing retainer 42 carries a pair of vertically spaced ball bearing assemblies 44 which are pressed into the retainer 42 and maintained in vertically-spaced relation by an annular spacer 45. The bearings 44 support for rotation a vertical parison shaft 47 having a reduced upper end 48 and an axial passage 49 open at each end. A beveled sheave 50 is fixed to each shaft 47 for co-rotation at a level below the plate 21.

Figure 9:
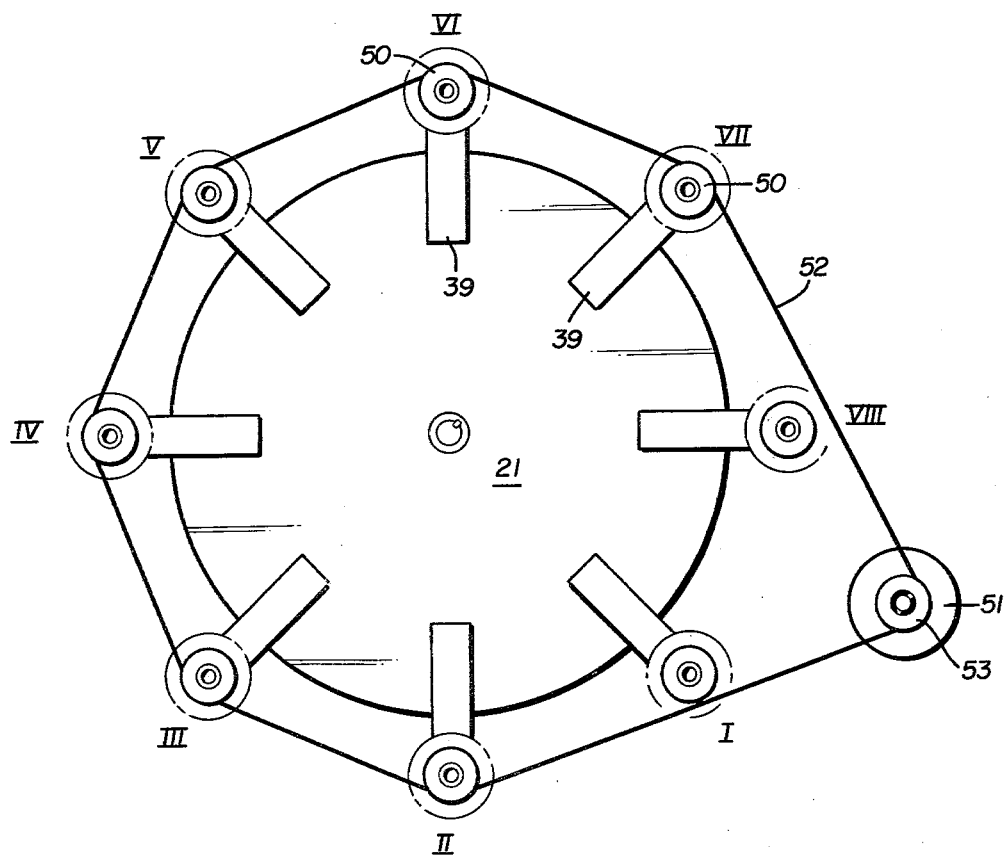
FIG. 9 is a schematic representation of the mechanism for rotating the parisons at the heating stations.

As best shown in FIG. 9 of the drawings, a drive motor 51 is located in spaced relation to the base plate 21, and an endless drive belt 52 is trained about the sheave 50 and a drive sheave 53 driven by the motor 51. It will be noted that the drive element 52 contacts only six of the eight sheaves 50, two of the sheaves being located within the perimeter of the belt 52, but out of contact therewith, for a purpose to be hereinafter more fully explained.

From FIG. 1, it will be noted that the entire drive structure thus described, and the rotatable base plate 21 is mounted on a lower support structure 55. Mounted upon the structure 55 is the mechanism, hereinafter described, to provide eight operating stations to which each of the parison shafts 47 is presented in turn, these stations being numbered I through VIII on FIGS. 2 and 6. In that embodiment of the invention illustrated in FIGS. 1 through 10, the stations II through VII are each heating stations; the station I is a loading-unloading station; and the station VIII is the blowing station.

From FIG. 2, it wil be seen that the heating stations II through VII are identical and are encompassed within a sheet metal structure defining a tunnel. This structure includes an arcuate support beam 56 underlying each of the stations II–VII and having a cantilevered outwardly projecting support plate 57 carrying vertical support brackets 58. A pair of upwardly projecting brackets 59 carry a horizontal support plate 60 upon which is built an open-bottomed rectangular support 61 comprising uprights 62 and an upper support plate 63. The inner upright 62 carries at its lower end a pair of support struts 64 retaining support plate 65 parallel to and spaced above the base plate 21.

This support plate 65 has an arcuate periphery and supports the inner wall 66 of the heating tunnel, which is indicated generally at 67. The outer wall of the heating tunnel 67 is indicated by reference numeral 68 and the outer wall 68 is supported by the brackets 58 secured to the support plate 57.

Projecting upwardly at each of the stations II–VII on inwardly projecting support brackets 69 positioned at each heating station is a pair of radiant, infra red heaters 70, each pair of heaters 70 being retained by brackets 71 mounted on the brackets 58. The heaters 70 are aligned with vertical apertures 72 in the exterior walls 68 of the tunnel 67. Mounted on the inner surface of the inner wall 66 in alignment with the apertures 72 and the heating elements 70 are sheet metal reflectors 73. At one or more of the heating stations II–VII, and specifically illustrated at the station IV are top heaters 75 which depend from support plate 76 overlying the tunnel 67 at the specific station.

The tunnel 67 has a top wall 76, but no bottom wall, to permit the movement of the parison supports and the parisons supported thereon into and through the tunnel. That end 67a of the tunnel adjacent the station I is open. The other end of the tunnel adjacent the station VII projects, as at 77, radially beyond the confines of the base 55 and then downwardly for communication with a source of air under pressure, such as a blower (not shown). The interior wall 66 of the tunnel 67 intermediate the stations VII and VIII is provided with an aperture 78 to accommodate passage of a parison from station VII to station VIII.

Figures 7, 8:
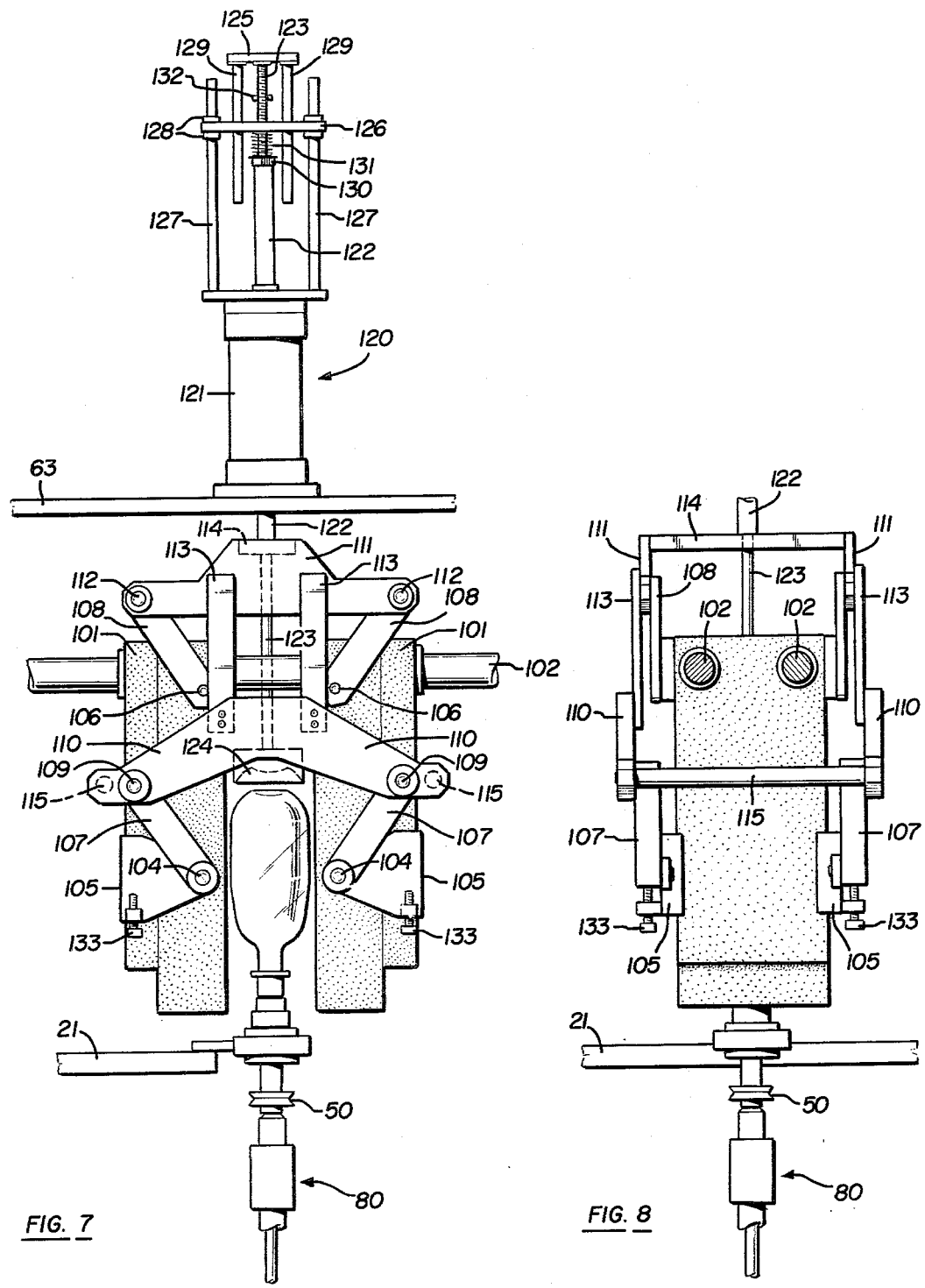
FIG. 7 is an enlarged fragmentary elevational view of the blow molding arrangement on an enlarged scale.
FIG. 8 is a side elevational view of the blow mold arrangement of FIG. 7.
Figure 10:
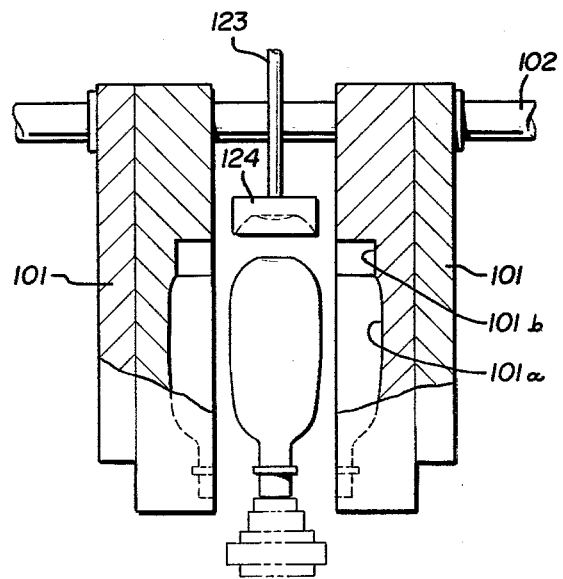
FIG. 10 is a view similar to FIG. 7 showing a blown article and the blow molds in an open position.

The blow molding station is best illustrated at FIGS. 7, 8 and 10. Located at the blow molding station VIII and beneath the base plate 21 for vertical alignment with the parison shaft 47 carried by the bracket 39 located at the blowing station VIII is the stretching and blowing assembly illustrated in FIG. 6 and identified by reference numeral 80. The asembly 80 is mounted upon the support 55 and comprises a lower cylinder assembly 81 secured to the support 55 by screws 56 and an upper cylinder asembly 82 also secured to the support 55 by suitable means, as by the screws 57.

The lower cylinder assembly comprises an upper cylinder block 83 and a lower cylinder block 84 confining therebetween a cylinder sleeve 85 within which a piston 86 having an actuating rod 87 is movable. The rod 87 is extended upwardly upon the introduction of air under pressure through the port 88 in the lower cylinder block 84 and is retracted upon the entry of air under pressure through the port 89 in the upper block 83.

The upper cylinder assembly 82 comprises an outer housing 90 and an inner housing 91 having a central bore through which the piston rod 87 projects. The outer housing has an enlarged upper bore 92 within which is positioned a second piston 93 having a tubular piston rod 94 provided with an internal bore 95 through which the rod 87 also projects. The upper end of the rod 94 is chamfered, as at 96, and is provided with an O-ring seal 97 for contacting the lower extremity of the parison shaft 47 when the rod 94 is extended upwardly by air under pressure introduced through the port 98 into the cylinder bore 92 beneath the piston 93.

Above the piston 93, the bore is vented to the atmosphere through a vent 98 and a cap 99 sealing the bore 92 and peripherally engaging the rod 94. The upper end of the rod 94 is provided wih an axial recess 100 which communicates with the parison shaft bore 49 when the rod 94 is actuated upwardly, and blow air under pressure is introduced into the recess 100 through supply line 101 for blowing the parison.

The blow mold arrangement is particularly illustrated in FIGS. 1, 7 and 8.

A pair of blow mold sections 101 having internal recesses cooperatively defining the shape to be blown are suspended for horizontal movement toward and away from one another from a transverse, horizontal support rod 102 bridging the two vertical supports 62. Each blow mold half is provided with a lower pivot pin 104 on a bracket 105 rigidly secured to the blow mold half and with an upper pivot pin 106. A pair of lower pivot links 107 are pivoted to the lower pivot pins 104, respectively, while upper pivot links 108 are pivotally connected to the upper pivot pins 106. The free upper ends of the lower pivot links 107 are pivoted, as on pins 109, to a lower pivot beam or yoke 110. An upper pivot beam or yoke 111 carries pivot pins 112 to which the upper ends of the upper links 108 are connected, as shown in FIG. 7. The beams 111 and 110 are interconnected by fixed straps 113 for joint vertical movement.

The linkage above described is duplicated on the other side of the molds, as best illustrated in FIG. 8 of the drawings, the linkages on the two sides being interconnected by an upper element 114 joining the beams 11 and by lower tie bars 115 joining the lower beams 110 at either extremity thereof.

The linkage is actuated by an upper fluid pressure assembly indicated generally at 120 and comprising a cylinder 121 having an actuating rod 122 which is joined to the upper strap 114. The rod 122 is tubular and projects above the cylinder 121 as well as below it. Extending through the tubular rod 122 is a threaded bottom plate rod 123 carrying at its lower end a mold bottom plate 124 and carrying at its upper extremity a guide plate 125. A stop plate 126 is located above the cylinder 121 and is located vertically by a pair of adjusting rods 127 threadedly receiving adjusting nuts 128 by means of which the plate 126 can be vertically adjusted. The stop plate 126 is provided with three aligned apertures with the threaded rod 123 extending through the center aperture and with two depending guide rods carried by the guide plate 125 projecting through the other two apertures. A stop nut 130 is threaded onto the rod 123 beneath the stop plate 126, and a compression spring 131 is confined between the nut 130 and the stop plate 126. A second stop nut 132 is located on the rod 123 between the guide plate 125 and the stop plate 126.

In the operation of the mold assembly illustrated in FIGS. 1, 7 and 8, it will be appreciated that the mold sections 101, when opened, receive therebetween a pairson carried on the parison shaft 47 located at the blow station VIII when the base plate 21 is indexed. When the blow mold sections 101 are open, the cylinder 121 has been actuated to elevate the actuating rod 122, the rod 122 abutting the stop nut 130 to thereafter elevate the threaded rod 123 vertically, while compressing the spring 131. Elevation of the rod 122 raises the beam 111 and, through the straps 113, the lower beam 110. The raising of the beams 111, 110, elevates the outer extremities of the links 108, 107, thereby moving the pivot pins 106, 104, outwardly (since the mold sections 101 can only move horizontally) and sliding the mold sections 101 outwardly relative to one another on the rods 102. After the rod 122 has been elevated sufficiently to contact the nut 130, continued movement of the rod 122 will elevate the mold bottom plate 124. The elevation of the mold plate 124, however, will not be accomplished until after the mold sections 101 have been opened to a degree sufficient to release the mold plate for such vertical movement.

When a parison has been indexed and positioned between the open mold sections, the cylinder 121 is actuated to lower the rod 122. Under the urging of the spring 131, the rod 123 moves with the rod 122, until such time as the stop nut 132 abuts the upper surface of the stop plate 126. At this time, continued downward movement of the rod 122 does not displace the mold bottom plate 124. As the rod 122 moves further downwardly, the beams 113 and 110 are lowered, moving the pivot pins 106, 104 inwardly and closing the mold sections 101 on the parison. Downward movement is continued until such time as the position of FIG. 1 is attained.

It will be noted that set screws 133 are provided on the brackets 105, the set screws being vertically adjustable so that their upper ends contact the undersurface of the links 107 as the links are moved downwardly from their position of FIG. 7 to their position of FIG. 1. The set screws are adjusted, so that the links 107 are stopped when the pivot pins 104, 109 are in exact horizontal alignment or "on dead center". When this position of FIG. 1 is attained, any forces tending to open the mold sections 101, such as the blowing force exerted upon the parison confined within the blow mold cavity, are exerted on and absorbed by the beam 110 in tension and the mold sections, in effect, are locked shut by the tensile strength of the beams 110.

OPERATION

In the operation of that emobidment of the invention illustrated in FIGS. 1 through 8, it will be appreciated that preformed, cold parisons P are loaded onto the parison shafts 47 at the station I. Upon the next indexing movement of the table 21, the loaded parison moves from station I to heating station II, the parison entering the open end 67a of the tunnel 67 and being moved by the table into alignment with the heating elements 70 at station II. The blow molded article is, during the same, repeated indexing movement of the table 21, progressively moved from station VIII to staion I. This blow molded article is then removed at station I and a fresh, cold parison is placed on the parison shaft.

As the cold parison enters the tunnel 67a, the sheave 50 on the parison shaft contacts the drive belt 52 and rotation of the motor sheave 53 will rotate the parison at the station II. The parison from station II is then indexed to staions III–VII in turn, being heated at each of the stations by the heating elements 70 and the upper heaters 75, if provided. At each station, the parison is aligned with the reflector 73 which acts to reflect back onto the parison any radiant heat from the heating elements 70 which was not directly absorbed by the parison.

At the same time, air is introduced through the tunnel 67, and this air becomes heated as it traverses from station VII to the successive stations to exit at the open tunnel end 67a. The parisons are thermally conditioned in the heated air by convection, as well as by direct radiation from the heating elements 70. The term heating-cooling or the term "thermally conditioned" is qpplied in connection wih the air flow, since the air may initally heat a cooled parison at station II and cool a hot parison at station VII. In any event, the air flow increases heat stability remarkably. In that period of time during which the parisons are being indexed from one station to the next station, the parisons are not heated by radiation, but they continue to be heated or cooled by convection from the hot air. Further, the air will be heated by the heated reflectors 73, even when a parison is not in position, so that the heating of the air is quite efficient and continuous. The parisons are heated-cooled continuously by convection and intermittently by radiation.

After a parison has attained station VII and has been heated there, the next indexing movement of the table 21 moves the parison through the aperture 78 in the wall of the tunnel 67 to the blow molding station VIII. It will be noted from FIG. 2 that the blow mold sections are cocked relative to a radial plane of the plate 21. The reason for this is quite simple. The parison entering station VIII from station VII is smaller in the radial dimension that the blown article exiting station VIII and being moved to the removal station I. By cocking the molds, increased clearance for the removal of the blown article is attained by sacrificing clearance for the entry of the parison. Thus, the opening dimension between the mold sections 101 can be reduced.

A parison positioned at Station VIII has been heated to an extent such that it is now susceptible to biaxial orientation. At station VIII, the first operation normally is closing of the blow mold sections 101, followed by the introduction of air through the port 98 beneath the piston 93 to displace the piston extension 94 upwardly into contact with the undersurface of the parison shaft 47 (see FIG. 6). This seals the air inlet chamber 100 to the interior passage 49 in the shaft 47 by means of the seal ring 97. This operation may be carried out before closure of the blow mold sections, if desired.

After closure of the blow molds, air is introduced through the port 98 to displace the piston 86 and the extended piston rod 87 vertically upwardly through the shaft bore 49 into contact with the interior bottom wall of the parison, and the parison bottom portion is displaced vertically upwardly and stretched mechanically. Blow air is introduced from the source of air through the line 101 into the interior of the parison either during or after stretching, depending upon the operation which is to be carried out. In any event, the combination of stretching and blowing interiorly of the blow mold cavity biaxially orients the material of the parison as it is formed into the blown final article.

Flowing blow molding, the cylinder 121 is actuated to move the linkage from its position of FIG. 1 to its position to FIG. 7 or FIG. 10, thereby opening the blow molds and accommodating removal of the blow article upon the next indexing movement of the table 21.

THE MODIFICATION OF FIG. 11

Figure 11:
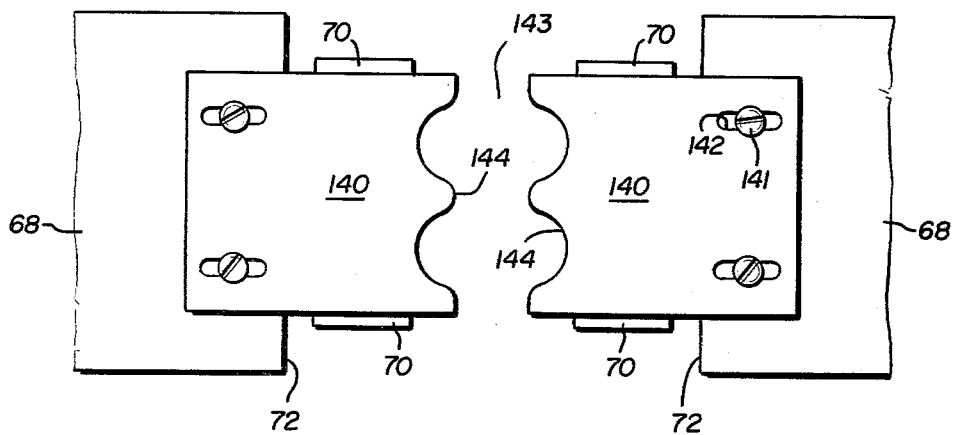
FIG. 11 is a view similar illustrating a modified form of heating station.

In FIG. 11, a modified form of tunnel aperture is illustrated. It will be recalled that the exterior wall 68 of the tunnel is apertured, as at 72, to accommodate heating of the parison in the tunnel by the heating element 70 located exteriorly of the tunnel.

In that embodiment of the invention illustrated in FIG. 11, heat baffles 140 are interposed between the heating elements 70 and the parison, these baffles 140 being in the form of separate plates secured to the exterior tunnel walls 68 by suitable means, such as bolts 141, located in slot 142 in the baffles 140. The baffles thus are adjustable toward and away from one another and to vary the space 143 therebetween. Further, the confronting edges 144 defining the space 143 may be contoured to impart a desired heat profile to the parison. One or more of the stations II-VII may be provided with such baffles 140, and the profiles of successive baffles may be varied as desired. This makes possible the heating of various portions of the parison to varying extents to promote stretching and blowing in a desired configuration. Although exposed directly to the heating elements 70, the shutters or baffles 140 are cooled by the air flowing through the tunnel.

THE EMBODIMENT OF FIG. 12

In the processing of some materials, such as polyvinyl chloride, it may be desirable to perform successive blowing operations upon the parison. In other words, the parison may be blown to a preform and the preform then blown into the final article.

Figure 12:
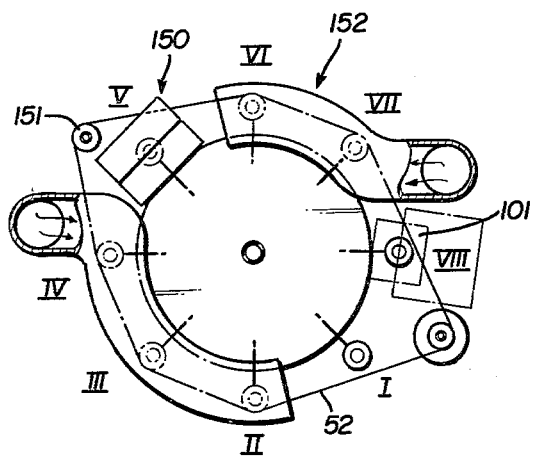
FIG. 12 is a schematic plan view of a modified blow molding apparatus incorporating two blow molding stations.

The apparatus of the present invention may be readily adapted to such blowing operation, as illustrated in FIG. 12. In FIG. 12, a second set of blow molds 150 is located at station V. Thus, a parison is heated at stations II, III and IV, then inflated to a preform at station V, and the preform is then heated at stations VI and VII for final blowing at station VIII in the blow mold sections 101. Either or both of these blowing stations may be provided with the stretching means of FIG. 6.

In order to prevent rotation of the parison at the blowing station V, an idler pulley 151 is utilized to pull the drive belt 52 from contact with the sheave of the parison shaft 47 located at station V, but without interrupting rotation of the parison shafts at stations II, III, IV, VI and VII. Further, the heating tunnel is interrupted at station V, preferably by supplying a first heating tunnel 152 for supplying air to stations VII and VI with a second tunnel supplying air to stations IV, III and II.

I claim:
1. In a method of blow molding plastic articles from heated thermoplastic parisons, the steps of:
   (1) conveying a plurality of parisons in succession through an enclosure defining a path of travel traversing successive, equally spaced work stations including successive radiant heating stations and a subsequent blow molding station, while rotating each parison except at said blow molding station;
   (2) temporarily interrupting said conveying along said path of travel at each successive radiant heating station while still continuing rotating such parisons;
   (3) conveying the parisons serially from the last radiant heating station to said blow molding station;
   (4) exposing each parison at each radiant heating station to infrared radiation and thus progressively providing each parison with a desired heat profile for blow molding;
   (5) injecting ambient air into said enclosure intermediate the last radiant heating station and said blow molding station;
   (6) blowing the injected air past the plurality of heating stations and the parisons in a direction counter to the direction in which the parisons are conveyed, each parison being heated to blow molding temperature by the radiation;
   (7) ceasing rotation of each parison at the blow molding station and there blow molding each parison in turn after it has been subjected (1) to the infrared radiation at each heating station and (2) to the heating-cooling effect of the countercurrent air to provide a blown plastic article.
2. The method of blow molding a plastic article from a parison of thermoplastic material, comprising steps of:
   (1) conveying the parison through a tunnel to and between successive, equally spaced operating stations including a plurality of successive radiant heating stations and a subsequent blow molding station;

(2) halting the parison in alignment with each station in turn;
(3) exposing the parison to infrared heating radiation at each radiant heating station and imparting a desired axially variable heat profile to such parison by baffling the radiation going to such parison at at least one of said radiant heating stations;
(4) blowing air through said tunnel counter-current to the path of travel of said parison through said radiant heating stations to continuously subject the parison to the heating-cooling effect of the air during the performance of steps 1-3, each parison being heated to the blow molding temperature by the infrared heating radiation; and
(5) blowing the heated parison at said blow molding station to provide a blown plastic article;

3. In a method of blow molding plastic articles from thermoplastic parisons, the steps of:
(1) advancing a plurality of spaced parisons along a path in stepwise fashion to successive, equally spaced work stations including a first loading station, a plurality of radiant heating stations and a subsequent blow molding station;
(2) at each of said radiant heating stations, temporarily ceasing said advancing while successively interposing each parison between a source of infrared radiation and a reflector to progressively heat the parisons to a blowable temperature;
(2a) baffling the radiation from the source of radiation to each parison, thereby imparting a desired axially variable heat profile to each parison;
(2b) rotating each parison while advancing the parison past the source of radiation;
(3) directing a flow of air in a confined path from a point intermediate said blow molding station and the adjacent heating station to a point intermediate said loading station and the heating station adjacent thereto, said flow of air (1) being directed in said path counter to the direction of advancement of said parisons, (2) being heated by the radiation sources and by the reflectors, (3) exerting a heating-cooling effect on the exterior surfaces of the parisons; and
(4) blowing each of the heated parisons in turn at said blow mold station to form a blown plastic article.

* * * * *

UNITED STATES PATENT AND TRADEMARK OFFICE
CERTIFICATE OF CORRECTION

PATENT NO. : 4,224,263
DATED : Sep. 23, 1980
INVENTOR(S) : Robert F. Kontz

It is certified that error appears in the above-identified patent and that said Letters Patent are hereby corrected as shown below:

Col. 1, line 13, "termoplastic" should be -- thermoplastic --;
line 15 after "preformed", the word "parison" should be inserted.

Col. 6, line 44, "staions" should be -- stations --.
Col. 7, line 41, "Flowing" should be -- following --.

Signed and Sealed this

Nineteenth Day of April 1982

[SEAL]

Attest:

GERALD J. MOSSINGHOFF

Attesting Officer    Commissioner of Patents and Trademarks